(12) United States Patent
Luthi et al.

(10) Patent No.: US 11,097,389 B2
(45) Date of Patent: Aug. 24, 2021

(54) IN-PORT SEQUENCE VALVE

(71) Applicant: VEKTEK LLC, Emporia, KS (US)

(72) Inventors: Aaron Vernon Luthi, Madison, KS (US); Claude Ashley Huffman, Connelly Springs, NC (US)

(73) Assignee: Vektek LLC, Emporia, KS (US)

( * ) Notice: Subject to any disclaimer, the term of this patent is extended or adjusted under 35 U.S.C. 154(b) by 215 days.

(21) Appl. No.: 16/252,983

(22) Filed: Jan. 21, 2019

(65) Prior Publication Data
US 2019/0224794 A1 Jul. 25, 2019

Related U.S. Application Data

(60) Provisional application No. 62/619,453, filed on Jan. 19, 2018.

(51) Int. Cl.
| | | |
|---|---|---|
| *F15B 13/02* | (2006.01) | |
| *B23Q 3/08* | (2006.01) | |
| *F15B 13/07* | (2006.01) | |
| *F15B 11/20* | (2006.01) | |
| *F16K 15/04* | (2006.01) | |
| *F15B 15/20* | (2006.01) | |

(52) U.S. Cl.
CPC ............ *B23Q 3/082* (2013.01); *F15B 11/20* (2013.01); *F15B 13/07* (2013.01); *F16K 15/046* (2013.01); *F15B 13/027* (2013.01); *F15B 15/204* (2013.01); *F15B 2211/783* (2013.01); *Y10T 137/7776* (2015.04); *Y10T 137/7777* (2015.04)

(58) Field of Classification Search
CPC ............ F15B 13/027; Y10T 137/7772; Y10T 137/7774; Y10T 137/7776; Y10T 137/7777; F16K 17/048
See application file for complete search history.

(56) References Cited

U.S. PATENT DOCUMENTS

| | | | |
|---|---|---|---|
| 4,270,567 A | * | 6/1981 | Tsukimoto ............ F16K 17/048 137/493.3 |
| 4,560,152 A | | 12/1985 | Miller |
| 5,695,177 A | | 12/1997 | Mascola |
| | | | (Continued) |

OTHER PUBLICATIONS

International Search Report and Written Opinion for PCT Appln. No. PCT/US2019/014558; Intl. Filing Date Jan. 22, 2019 and all references cited therein.

*Primary Examiner* — Kevin F Murphy
(74) *Attorney, Agent, or Firm* — Hovey Williams LLP

(57) ABSTRACT

An in-port sequencing valve configured to be utilized with a clamping device of a workpiece clamping system having a fixture plate, a number of fixture datums, and a number of clamping devices. The in-port sequencing valve includes a housing, a pre-load adjuster, a valve spring, and a valve piston. The pre-load adjuster is configured to be set to a selected valve activation setting. The valve spring is compressed an amount corresponding to the valve activation setting. The valve piston is configured to be shifted from a closed position to an open position when a force due to hydraulic fluid pressure overcomes a threshold spring force of the valve spring corresponding to the valve activation setting. The in-port sequencing valve can be set to a selected valve activation setting so that the clamping devices clamp the workpiece in a selected order according to the valve activation setting.

21 Claims, 7 Drawing Sheets

(56) References Cited

U.S. PATENT DOCUMENTS

| | | | |
|---|---|---|---|
| 6,648,010 B1 * | 11/2003 | Goodwin | F16K 15/03 137/491 |
| 7,140,385 B2 * | 11/2006 | Thoms | F16K 17/105 137/493.6 |
| 2006/0261532 A1 | 11/2006 | Okubo et al. | |
| 2012/0160335 A1 | 6/2012 | Thyroff et al. | |
| 2017/0113329 A1 | 4/2017 | Takahashi | |

* cited by examiner

IN-PORT SEQUENCE VALVE

RELATED APPLICATIONS

This non-provisional patent application claims priority benefit with regard to all common subject matter of earlier-filed U.S. Provisional Patent Application Ser. No. 62/619,453 filed on Jan. 19, 2018, and entitled "IN-PORT SEQUENCE VALVE". The identified earlier-filed provisional patent application is hereby incorporated by reference in its entirety into the present application.

BACKGROUND

Clamping devices are used in various manufacturing processes to hold a workpiece in place on a fixture while the workpiece is machined by a computer numerical control (CNC) machine tool or the like. The clamping devices may be hydraulically actuated in a specific sequence via a number of system level sequence valves to provide incremental and/or sequenced clamping or stabilizing force to the workpiece. This requires substantial planning and circuit design.

The hydraulic sequence circuits also require substantial plumbing. For example, several straight-line internal passageways that cannot curve around other features must be drilled into fixture plates and other supporting structures. Routing such internal passageways is difficult for fixtures that have several devices or window features. Furthermore, "drill walk" may cause two passageways to accidentally intersect each other, which is un-reparable and may render the entire fixture plate unusable. This difficulty in routing internal passageways causes design constraints and limitations to clamping device sequencing.

Once the sequence circuits have been fabricated, any design changes and/ corrections may be difficult and costly to implement. The machined fixture plates may even need to be discarded and replaced. Costly and time-consuming corrections or replacements are often foregone in favor of incorrect or inefficient clamping systems, thus resulting in poor workpiece locational repeatability and hence poor workpiece quality. Furthermore, adjacent internal passageways may fail over time due to high hydraulic pressure.

SUMMARY OF THE INVENTION

Embodiments of the invention solve the above-mentioned problems and other related problems and provide a distinct advance in the art of clamp sequencing.

One embodiment of the invention is an in-port sequencing valve that may be coupled with a swing clamp or other hydraulic device. The in-port sequencing valve broadly comprises a housing, a pre-load adjuster, a pre-load adjuster lock, a valve spring, a spring plunger, a stroke stop washer, a stroke stop retention ring, an adjustment retention ring, a valve piston, a valve piston seal, a valve piston seal ring, a check valve, a bottom port seal, a bottom port seal spacer, and a port spot-face seal.

The housing houses the pre-load adjuster, the valve spring, the spring plunger, the stroke stop washer, and the valve piston and includes opposing aft and forward portions, outer clamp port threads, bottom port seal geometry, bottom port seal retention geometry, port spot-face seal geometry, a spring chamber, adjustment threads, a valve piston chamber, an inlet channel, and an outlet channel.

The outer clamp port threads encircle an outer side of the housing near the forward portion for securing the in-port sequencing valve in a clamp port of a hydraulic device. Alternatively, other retaining features such as clips, latches, grooves, slots, cams, and the like may be used.

The bottom port seal geometry receives the bottom port seal and may be an annular groove near a distal end of the forward portion of the housing. The bottom port seal retention geometry retains the bottom port seal spacer and hence the bottom port seal on the forward portion of the housing and may be a small flange, a lip, a protrusion, or other similar feature.

The port spot-face seal geometry receives the port spot-face seal and may be an annular groove aft of the bottom port seal geometry. The port spot-face seal geometry also prevents the port spot-face seal from sliding forward or aft.

The spring chamber is positioned in the aft portion and connects to the valve piston chamber. The spring chamber at least partially receives the pre-load adjuster, the valve spring, the spring plunger, the stroke stop washer, the stroke stop retention ring, and the adjustment retention ring therein.

The adjustment threads encircle the spring chamber aft of the valve spring and engage adjustment threads of the pre-load adjuster. The adjustment threads convert axial rotation of the pre-load adjuster to longitudinal movement of the pre-load adjuster relative to the housing.

The valve piston chamber is positioned in the forward portion of the housing and is connected to the spring chamber. The valve piston chamber receives the valve piston therein and may have a diameter substantially smaller than the diameter of the spring chamber.

The inlet channel extends radially inward from a side of the housing into the valve piston chamber and is configured to be fluidly aligned with an inlet passageway fluidly connected to the clamp port. In some embodiments, additional inlet channels may be spaced around the circumference of the housing for ensuring compatibility with other clamp ports.

The outlet channel extends longitudinally from a distal end of the valve piston chamber through the distal end of the forward portion of the housing for fluidly connecting the valve piston chamber to an outlet passageway fluidly connected to the clamp port. The outlet channel may include complementary sealing geometry for sealingly engaging complementary geometry of the valve piston.

The pre-load adjuster is in forcible communication with the valve spring for compressing the valve spring an amount corresponding to a selected valve activation setting and includes opposing aft and forward ends, adjustment geometry, adjustment threads, a spring plunger cavity, a relief vent, a retention flange, and lock threads.

The adjustment geometry receives a wrench or similar tool for selecting and/or adjusting the valve activation setting. For example, the adjustment geometry may be a female hexagonal cavity for receiving a hex key. The adjustment threads engage adjustment threads of the housing for converting axial rotation of the pre-load adjuster to longitudinal movement of the pre-load adjuster relative to the housing.

The spring plunger cavity extends to the forward end of the pre-load adjuster and receives an aft end of the spring plunger therein. The spring plunger cavity may also keep the spring plunger in axial alignment with the valve piston and the valve spring.

The relief vent extends between the spring plunger cavity and the adjustment geometry. The relief vent equalizes pressure in the spring chamber with atmospheric pressure as the components in the spring chamber are shifted. This prevents hysteresis (e.g., sluggish or non-existent response).

The retention flange is configured to engage the adjustment retention ring to ensure that the pre-load adjuster cannot be removed from the spring chamber. To that end, the retention flange may be a lip or other annular protrusion having an effective outer diameter greater than an effective inner diameter of the adjustment retention ring.

The lock threads engage lock threads of the pre-load adjuster lock. The lock threads may be standard helical threads or may be any suitable groove, slot, or cam for urging the pre-load adjuster lock against the housing, thereby frictionally locking the pre-load adjuster relative to the housing.

The pre-load adjuster lock secures the pre-load adjuster at a desired setting and includes lock threads and a lock hex. The lock threads engage with the lock threads of the pre-load adjuster so that the pre-load adjuster lock can be tightened against the housing. The lock hex allows the pre-load adjuster lock to be tightened via a wrench or the like.

The valve spring is disposed in the spring chamber and is in forcible communication between the pre-load adjuster and the spring plunger. The valve spring may be a coil spring, a die spring, a disc spring, a wave spring, and the like. The valve spring may also be a series of springs (i.e., a spring pack) stacked in parallel, in series, or in a combination of parallel and series.

The spring plunger is in forcible communication between the valve spring and the valve piston and may include spring engagement geometry and a valve piston recess. The spring engagement geometry axially engages the valve spring. The valve piston recess receives an aft end of the valve piston.

The stroke stop washer establishes a maximum aft travel limit of the valve piston. The stroke stop washer may have a tight tolerance fit (i.e., a locational fit) to ensure concentric alignment of the stroke stop washer with the valve piston.

The stroke stop retention ring keeps the stroke stop washer near a forward end of the spring chamber and may fit into a small groove in the spring chamber. The adjustment retention ring retains the pre-load adjuster and hence the valve spring and spring plunger in the spring chamber. The adjustment retention ring may sit in a small groove in the spring chamber.

The valve piston is disposed substantially in the valve piston chamber in forcible communication with the spring plunger and includes an aft section, a forward section, and a connecting pin. The valve piston governs passage of hydraulic fluid from the inlet channel to the outlet channel.

The aft section includes an annular shoulder, seal ring receiving geometry, and a check valve spring recession. The aft section is radiused on its proximal end to form a ball-and-socket interface with the spring plunger. The annular shoulder abuts the stroke stop washer to establish a maximum aft travel limit of the valve piston. The seal ring receiving geometry retains the valve piston seal and the valve piston seal ring therein.

The forward section includes a check valve outlet through-hole, a check valve inlet through-hole, and complementary sealing geometry. The check valve outlet through-hole is fluidly aligned with the inlet channel of the housing. The check valve inlet through-hole is fluidly aligned with the outlet channel.

The complementary sealing geometry extends annularly around the distal end of the forward section and is configured to contact the complementary sealing geometry of the outlet channel so as to form a hydraulic seal therebetween.

The connecting pin is positioned in aligning receiving geometry of the aft section and forward section. The connecting pin retains the aft section and the forward section together so they slide longitudinally in unison.

The valve piston seal encircles the aft section in the seal ring receiving geometry and prevents hydraulic fluid from passing into the spring chamber. The valve piston seal ring encircles the valve piston seal and slides against the inside of the valve piston chamber.

The check valve governs the passage of hydraulic fluid from the check valve inlet through-hole to the check valve outlet through-hole (and hence from the outlet channel to the inlet channel) when the valve piston is in a closed position and may include a ball and a check valve spring. The ball is configured to be seated against an inner surface of the forward section extending around the check valve inlet through-hole. The check valve spring is at least partially disposed in the check valve spring recession and biases the ball toward a closed position.

The bottom port seal encircles the housing near the distal end of the forward portion and is seated in the bottom port seal geometry. The bottom port seal engages a sidewall of the clamp port, thereby sealing the clamp port between the inlet passageway and the outlet passageway.

The bottom port seal spacer encircles the housing forward of the bottom port seal and interlocks with the bottom port seal retention geometry. The bottom port seal spacer may be a washer, a ring, or the like. The bottom port seal spacer contacts a back wall of the clamp port and thereby presses the bottom port seal into sealing engagement with the clamp port.

The port spot-face seal encircles the housing near a middle of the housing and is seated in the port spot-face seal geometry. The port spot-face seal engages the spot-face seal geometry of the clamp port.

To preset the in-port sequencing valve to a desired valve activation setting, the pre-load adjuster is axially turned via a hex key inserted into the adjustment geometry. The pre-load adjuster in turn compresses the valve spring until the valve spring is compressed an amount corresponding to the desired valve activation setting.

The in-port sequencing valve may then be locked at the selected valve activation setting via the pre-load adjuster lock. The pre-load adjuster lock is axially rotated and in turn contacts the aft portion of the housing, whereby friction between the pre-load adjuster lock and the housing prevents the pre-load adjuster from rotating out of the selected valve activation setting.

Another embodiment of the invention is a clamping system that utilizes several of the above-described in-port sequencing valves. The clamping system broadly comprises a fixture plate, a number of fixture datums, a number of swing clamps, a number of work supports, a number of link clamps, a number of port plugs, and a number of in-port sequencing valves such as the in-port sequencing valve described above. The clamping system may also include or may be connected to a hydraulic pump, a system valve, a number of hydraulic clamp lines, a number of hydraulic unclamp lines, and a hydraulic reservoir.

The fixture plate supports the fixture datums, swing clamps, work supports, and link clamps. The fixture plate includes a number of hydraulic passageways for allowing the hydraulic clamp lines and hydraulic unclamp lines to be fluidly connected to the swing clamps, work supports, and/or link clamps.

The fixture datums support a workpiece initially and may be cylindrical columns, elevated support structures, and the like. Each fixture datum is configured to be positioned directly under a swing arm of one of the swing clamps when the swing arm is in a clamping position.

Each swing clamp secures the workpiece against one of the fixture datums and broadly comprises a riser base, a clamp body, a clamp piston, a piston rod, a swing arm, and a workpiece contact. The swing clamps are fitted with port plugs, the purpose of which will be described below.

The riser base supports the clamp body and includes a cavity for receiving the clamp body and hydraulic fluid passageways for fluidly connecting the swing clamp to the hydraulic clamp lines and the hydraulic unclamp lines.

The clamp body is at least partially positioned in the riser base cavity and includes a clamp piston chamber, a clamp port, and an unclamp port. The clamp body also includes hydraulic fluid passageways for fluidly connecting the clamp port to the hydraulic clamp lines, the unclamp port to the hydraulic unclamp lines, and the clamp port and unclamp port to the clamp piston chamber.

The clamp piston chamber encloses the clamp piston and is a substantially vertically extending cylindrical chamber. The clamp piston chamber is divided by a seal of the clamp piston into a clamp stroke region fluidly connected to the clamp port and an unclamp stroke region fluidly connected to the unclamp port.

The clamp port is an open-ended cavity fluidly connected between the clamp lines and the clamp stroke region of the clamp piston chamber. The clamp port receives an in-port sequencing valve or a port plug depending on clamp sequencing as described below.

The unclamp port is an open-ended cavity fluidly connected between the hydraulic unclamp lines and the unclamp stroke region of the clamp piston chamber. The unclamp port receives an in-port sequencing valve or a port plug depending on unclamp sequencing as described below.

The clamp piston vertically moves the piston rod and hence the swing arm and workpiece contact between an unclamped position and a clamped position. As mentioned above, a seal of the clamp piston divides the piston chamber into a clamp stroke region and an unclamp stroke region.

The piston rod extends upward from the clamp piston to the swing arm. The piston rod is cylindrical and may follow a cam or the like to rotate the swing arm over the workpiece.

The swing arm extends over the workpiece in the clamped position. To that end, the swing arm is configured to be rotated about a vertical axis from the unclamped position to the clamped position via the piston rod.

The workpiece contact engages the workpiece from above and may be a gripper, a shoe, a contact button, a contact bolt, an end effector, or the like. Alternatively, the swing arm may contact the workpiece directly.

Each work support engages the workpiece from below at a secondary support point and broadly comprises a lower block, a work support body, a work support piston, a plunger, a workpiece contact, and a locking sleeve. The work supports are fitted with in-port valves, the purpose of which will be described below.

The lower block supports the work support body and includes an inlet passageway, an outlet passageway, and a clamp port. The inlet passageway fluidly connects hydraulic clamp lines to the clamp port and radially (i.e., vertically in this case) intercepts the clamp port. The outlet passageway fluidly connects the clamp port to a piston bore and a locking sleeve chamber of the work support body and extends longitudinally (i.e., horizontally in this case) from the clamp port.

The clamp port is an open-ended cavity fluidly connected between the hydraulic clamp lines via the inlet passageway and the piston bore and locking sleeve chamber via the outlet passageway. The clamp port receives an in-port sequencing valve or a port plug depending on clamp sequencing as described below.

The work support body is positioned in the lower block and includes a plunger chamber and the aforementioned piston bore and locking sleeve chamber. The work support body also includes a hydraulic fluid passageway for connecting the outlet passageway to the piston bore and the locking sleeve chamber.

The plunger chamber at least partially encloses the plunger and may be a substantially vertically extending cylindrical chamber. The plunger chamber may be fluidly partitioned or sealed from the piston bore and locking sleeve chamber such that the plunger chamber does not receive hydraulic fluid.

The piston bore at least partially encloses the work support piston therein and may be a substantially vertically extending cylindrical chamber. The piston bore receives hydraulic fluid below the work support piston for actuating the plunger via the work support piston.

The locking sleeve chamber at least partially encloses the locking sleeve and at least partially encircles the plunger chamber. The locking sleeve chamber receives hydraulic fluid for actuating the locking sleeve against the plunger.

The work support piston at least partially resides in the piston bore of the work support body and is configured to shift the plunger to an extended position when sufficient hydraulic pressure builds in the piston bore below the work support piston. The work support piston may be cylindrical or any other suitable shape.

The plunger is at least partially positioned in the plunger chamber and vertically moves the workpiece contact between a retracted position and an extended position. The plunger may be cylindrical or any other suitable shape.

The workpiece contact engages the workpiece from below and may be a gripper, a shoe, a contact button, a contact bolt, an end effector, or the like. Alternatively, the plunger may contact the workpiece directly.

The locking sleeve at least partially encircles the plunger and is configured to engage the plunger when the plunger is in an extended position. The locking sleeve may be flexible and/or may be shiftable between disengaged and engaged configurations or positions. The locking sleeve may be biased toward a disengaged position via a biasing spring or may be self-biased.

Each link clamp engages the workpiece from above, opposite the work supports, at the secondary support points, and broadly comprises a riser base, a clamp body, a clamp piston, a piston rod, left and right fulcrum links, and a pivot arm. The link clamps are fitted with port plugs and in-port sequencing valves, the purpose of which will be described below.

The riser base supports the clamp body and includes a cavity for receiving the clamp body and hydraulic fluid passageways for fluidly connecting the link clamp to the hydraulic clamp lines and the hydraulic unclamp lines.

The clamp body is at least partially positioned in the riser base cavity and includes a clamp piston chamber, a clamp port, and an unclamp port. The clamp body also includes hydraulic fluid passageways for fluidly connecting the clamp port to the hydraulic clamp lines, the unclamp port to the hydraulic unclamp lines, and the clamp port and unclamp port to the clamp piston chamber.

The clamp piston chamber encloses the clamp piston and may be a substantially vertically extending cylindrical chamber. The clamp piston chamber is divided by a seal of the clamp piston into a clamp stroke region fluidly connected to the clamp port and an unclamp stroke region fluidly connected to the unclamp port.

The clamp port is an open-ended cavity fluidly connected between the hydraulic clamp lines and the clamp stroke region of the clamp piston chamber. The clamp port receives an in-port sequencing valve or a port plug depending on clamp sequencing as described below.

The unclamp port is an open-ended cavity fluidly connected between the hydraulic unclamp lines and the unclamp stroke region of the clamp piston chamber. The unclamp port receives an in-port sequencing valve or a port plug depending on unclamp sequencing.

The clamp piston vertically rotates the pivot arm between an unclamped position and a clamped position via the piston rod. As mentioned above, the clamp piston seal divides the piston chamber into the aforementioned clamp stroke region and unclamp stroke region.

The piston rod extends upward from the clamp piston so as to connect the pivot arm to the clamp piston. The piston rod may be cylindrical and may be connected to the pivot arm via a pin, a bolt, interlocking geometry, or the like.

The fulcrum links create a pivot point for the pivot arm and are themselves pivotably connected to the clamp body and to the pivot arm near a midpoint of the pivot arm. The fulcrum links allow the pivot arm to move in a complex motion so that the workpiece can be removed from the clamping system after unclamping.

The pivot arm is configured to pivot over the workpiece and is connected to the piston rod near the pivot arm's proximal end and to the fulcrum links near its midpoint. The pivot arm is configured to move away from the workpiece in a complex motion via the fulcrum links so that the workpiece can be removed from the clamping system after unclamping.

The port plugs are configured to be inserted into some of the clamp ports and/or unclamp ports of the swing clamps, work supports, and link clamps so as to seal off the open end of those (un)clamp ports while allowing hydraulic fluid to flow through the (un)clamp ports. To that end, the port plugs may have a solid cylindrical body including external threads, and an annular seal.

After in-port sequencing valves are inserted into the clamping devices and preset as desired, the workpiece is positioned on the fixture datums with the swing clamps and link clamps in an unclamp position and the work supports in a retracted position. A first or "nominal" sequence pressure then actuates the clamping devices that do not have an in-port sequencing valve installed. For example, the swing clamps may be installed with port plugs instead of in-port sequencing valves. Meanwhile, the nominal sequence pressure does not activate the in-port sequencing valves installed in the other clamping devices so the other clamping devices are not actuated.

Hydraulic pressure increases to a second sequence pressure corresponding to a valve activation setting of some of the in-port sequencing valves. For example, the in-port sequencing valves of the work supports may be set to a valve activation setting of 1,000 psi. As the hydraulic pressure reaches the second sequence pressure of 1,000 psi, hydraulic fluid in the valve piston chamber forces the valve piston to an open position. Specifically, when the force from hydraulic pressure overcomes the bias force of the valve spring, the valve piston begins to shift toward the spring chamber (i.e., to an open position), thus allowing hydraulic fluid to flow into the outlet channel. The work supports become pressurized and shift to and lock in an extended position as a result of these in-port sequencing valves being activated.

Hydraulic pressure then increases to a third sequence pressure corresponding to a valve activation setting of additional in-port sequencing valves. For example, the in-port sequencing valves of the link clamps may be set to a valve activation setting of 2,500 psi. The additional in-port sequencing valves activate at this sequence pressure such that the link clamps become pressurized and shift to a clamped position after the work supports are actuated.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
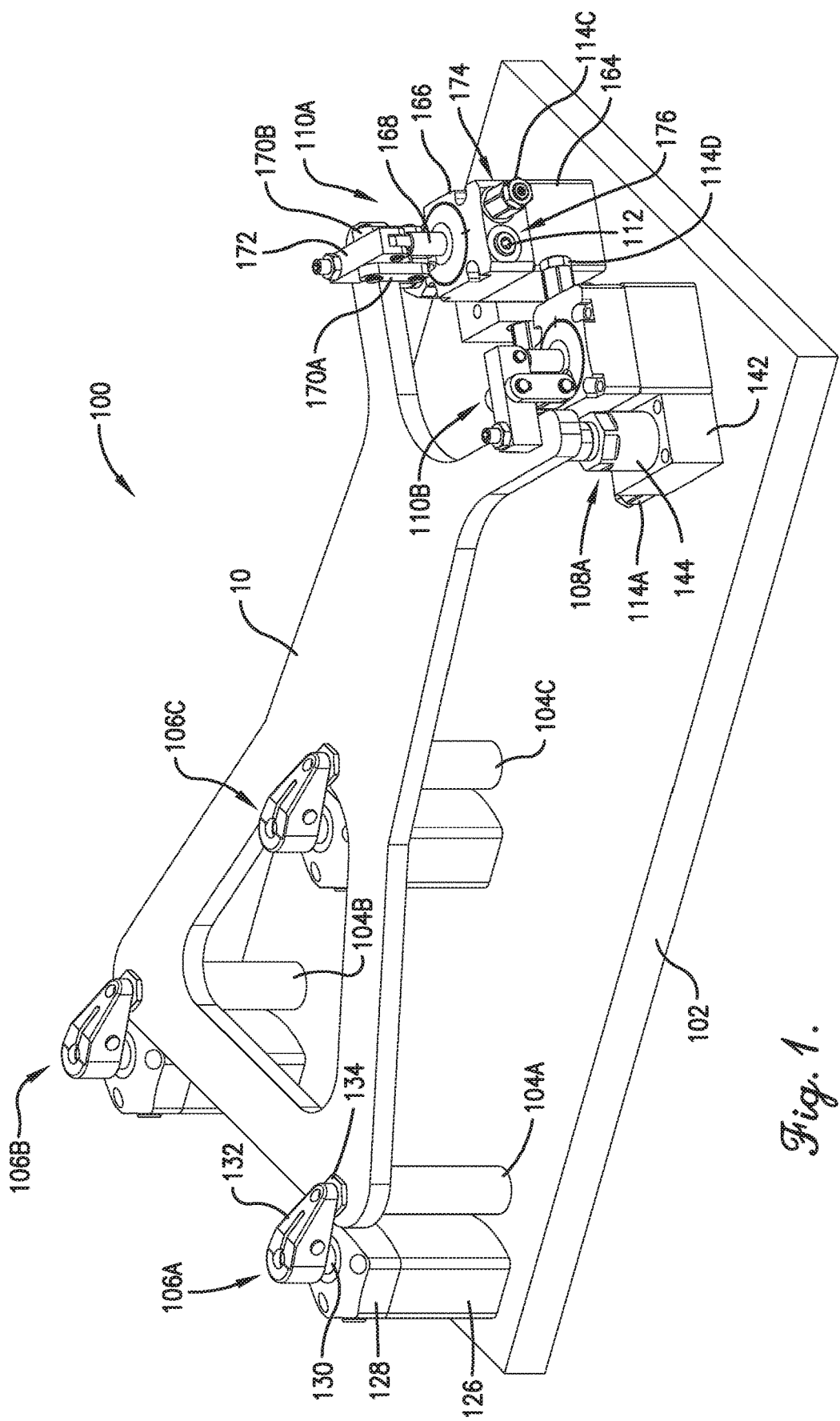
FIG. 1 is a top perspective view of a clamping system constructed in accordance with an embodiment of the invention.
Figure 2:
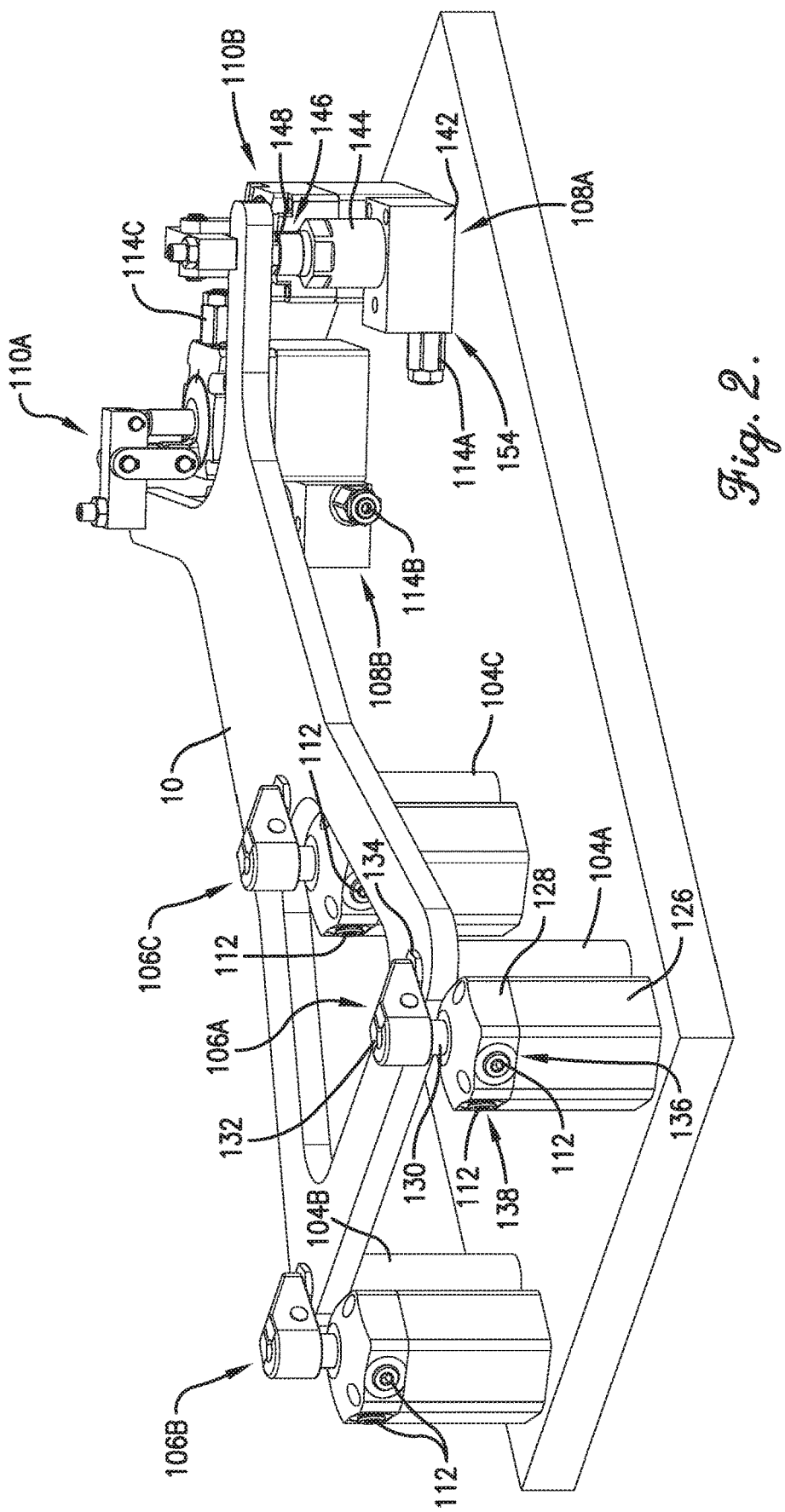
FIG. 2 is another top perspective view of the clamping system of FIG. 1.
Figure 3:
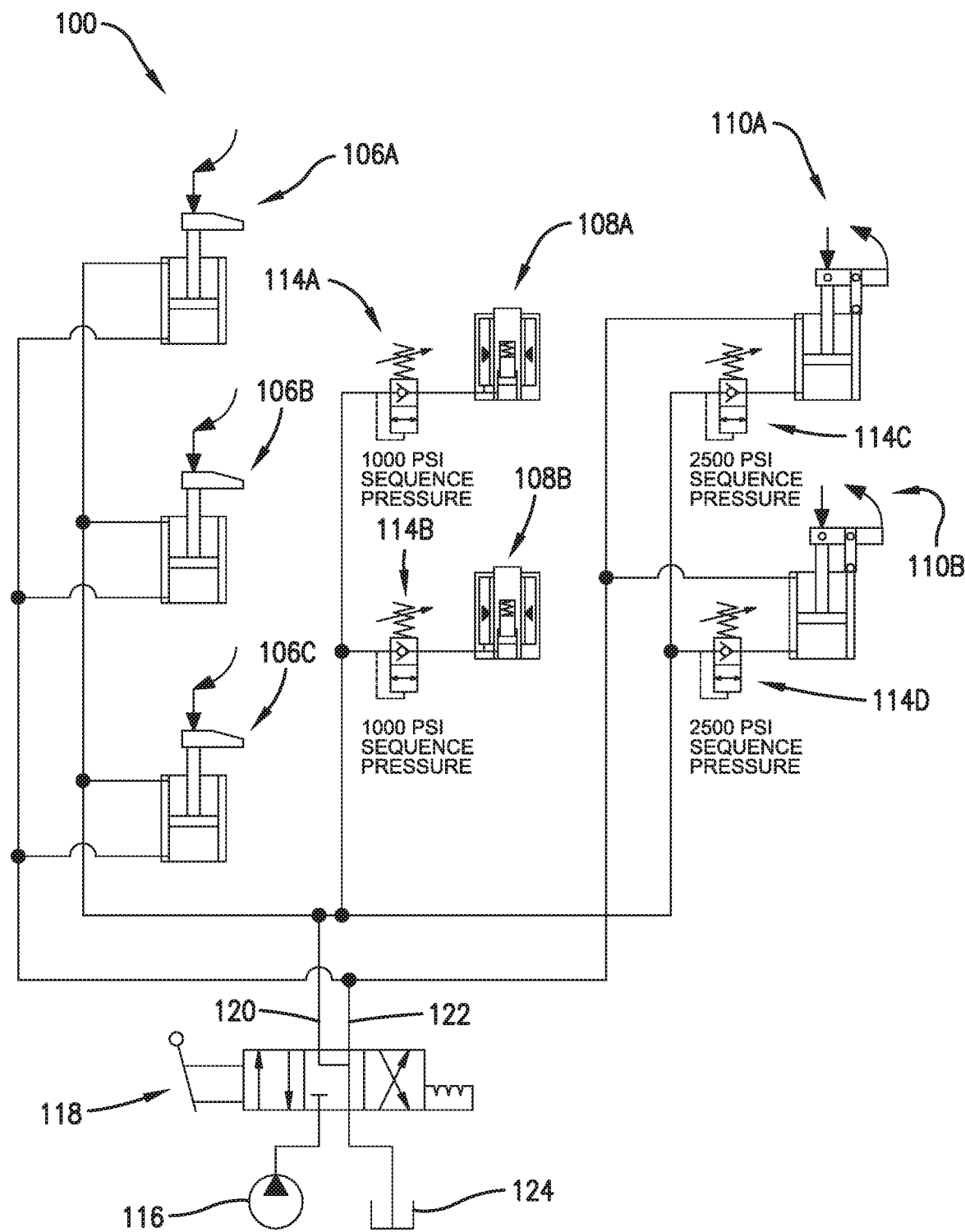
FIG. 3 is a schematic diagram of the clamping system of FIG. 1.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Embodiments of the present invention include an in-port sequencing valve, a clamping device that may be coupled with the in-port sequencing valve, and a clamping system that may include a plurality of clamping devices fitted with in-port sequencing valves. The in-port sequencing valve and the clamping device will be discussed as components of the clamping system.

Turning to FIGS. 1-4, a clamping system 100 constructed in accordance with an embodiment of the invention is illustrated. The clamping system 100 is configured to clamp a workpiece 10 for a machining or manufacturing operation such as computer-numerical control (CNC) milling.

The clamping system 100 broadly comprises a fixture plate 102, a plurality of fixture datums 104A-C, a plurality of swing clamps 106A-C, a plurality of work supports 108A,B, and a plurality of link clamps 110A,B. The clamping system 100 may be fitted with a plurality of port plugs 112 and a plurality of in-port sequencing valves 114A-D. The clamping system 100 may also include a hydraulic pump 116, a system valve 118, a plurality of hydraulic clamp lines 120, a plurality of hydraulic unclamp lines 122, and a hydraulic reservoir 124.

The fixture plate 102 supports the fixture datums 104A-C, swing clamps 106A-C, work supports 108A,B, and link clamps 110A,B. The fixture plate 102 may include a plurality of hydraulic passageways for allowing the hydraulic clamp lines 120 and hydraulic unclamp lines 122 to be fluidly connected to the swing clamps 106A-C, work supports 108A,B, and link clamps 110A,B.

The fixture datums 104A-C support the workpiece 10 initially and may be cylindrical columns, elevated support structures, and the like. Each fixture datum 104A-C may be positioned directly under a swing arm of one of the swing clamps 106A-C when the swing arm is in a clamping position.

The swing clamps 106A-C clamp the workpiece 10 onto the fixture datums 104A-C and are substantially identical so only swing clamp 106A will be described in detail. The swing clamp 106A broadly comprises a riser base 126, a clamp body 128, a clamp piston, a piston rod 130, a swing arm 132, and a workpiece contact 134. In this embodiment, the swing clamp 106A is fitted with two port plugs 112.

The riser base 126 supports the clamp body 128 and may include a cavity for receiving the clamp body 128 and hydraulic fluid passageways for fluidly connecting the swing clamp 106A to the hydraulic clamp lines 120 and the hydraulic unclamp lines 122.

The clamp body 128 may be at least partially positioned in the riser base cavity and includes a clamp piston chamber, a clamp port 136, and an unclamp port 138. The clamp body 128 may also include hydraulic fluid passageways for fluidly connecting the clamp port 136 to the hydraulic clamp lines 120, the unclamp port 138 to the hydraulic unclamp lines 122, and the clamp port 136 and unclamp port 138 to the clamp piston chamber.

The clamp piston chamber encloses the clamp piston and may be a substantially vertically extending cylindrical chamber. The clamp piston chamber may be divided by a seal of the clamp piston into a clamp stroke region fluidly connected to the clamp port 136 and an unclamp stroke region fluidly connected to the unclamp port 138.

The clamp port 136 is an open-ended cavity fluidly connected between the clamp lines 120 and the clamp stroke region of the clamp piston chamber. The clamp port 136 receives an in-port sequencing valve or a port plug depending on clamp sequencing as described below. In this exemplary embodiment, the open end of the clamp port 136 is closed via a port plug 112 while allowing hydraulic fluid to flow freely to the clamp stroke region of the clamp piston chamber. To that end, the clamp port 136 may include helical threads for securing the port plug 112 (or an in-port sequencing valve) therein.

The unclamp port 138 is an open-ended cavity fluidly connected between the hydraulic unclamp lines 122 and the unclamp stroke region of the clamp piston chamber. The unclamp port 138 receives an in-port sequencing valve or a port plug depending on unclamp sequencing as described below. In this exemplary embodiment, the open end of the unclamp port 138 is closed via a port plug 112 while allowing hydraulic fluid to flow freely to the unclamp stroke region of the clamp piston chamber. To that end, the unclamp port 138 may include helical threads for securing the port plug 112 (or an in-port sequencing valve) therein.

The clamp piston is positioned in the clamp piston chamber and vertically moves the piston rod 130 and hence the swing arm 132 and workpiece contact 134 between an unclamped position and a clamped position. As mentioned above, a seal of the clamp piston may divide the piston chamber into a clamp stroke region and an unclamp stroke region.

The piston rod 130 extends upward from the clamp piston to the swing arm 132. The piston rod 130 may be cylindrical and may follow a cam or the like to rotate the swing arm 132 over the workpiece 10.

The swing arm 132 extends over the workpiece 10 in the clamped position. To that end, the swing arm 132 is configured to be rotated about a vertical axis from the unclamped position to the clamped position via the piston rod 130.

The workpiece contact 134 engages the workpiece 10 from above and may be a gripper, a shoe, a contact button, a contact bolt, an end effector, or the like. Alternatively, the swing arm 132 may contact the workpiece 10 directly.

The work supports 108A,B engage the workpiece 10 from below at secondary support point and are substantially identical so only work support 108A will be described in detail. The work support 108A broadly comprises a lower block 142, a work support body 144, a work support piston, a plunger 146, a workpiece contact 148, and a locking sleeve.

Figure 4:
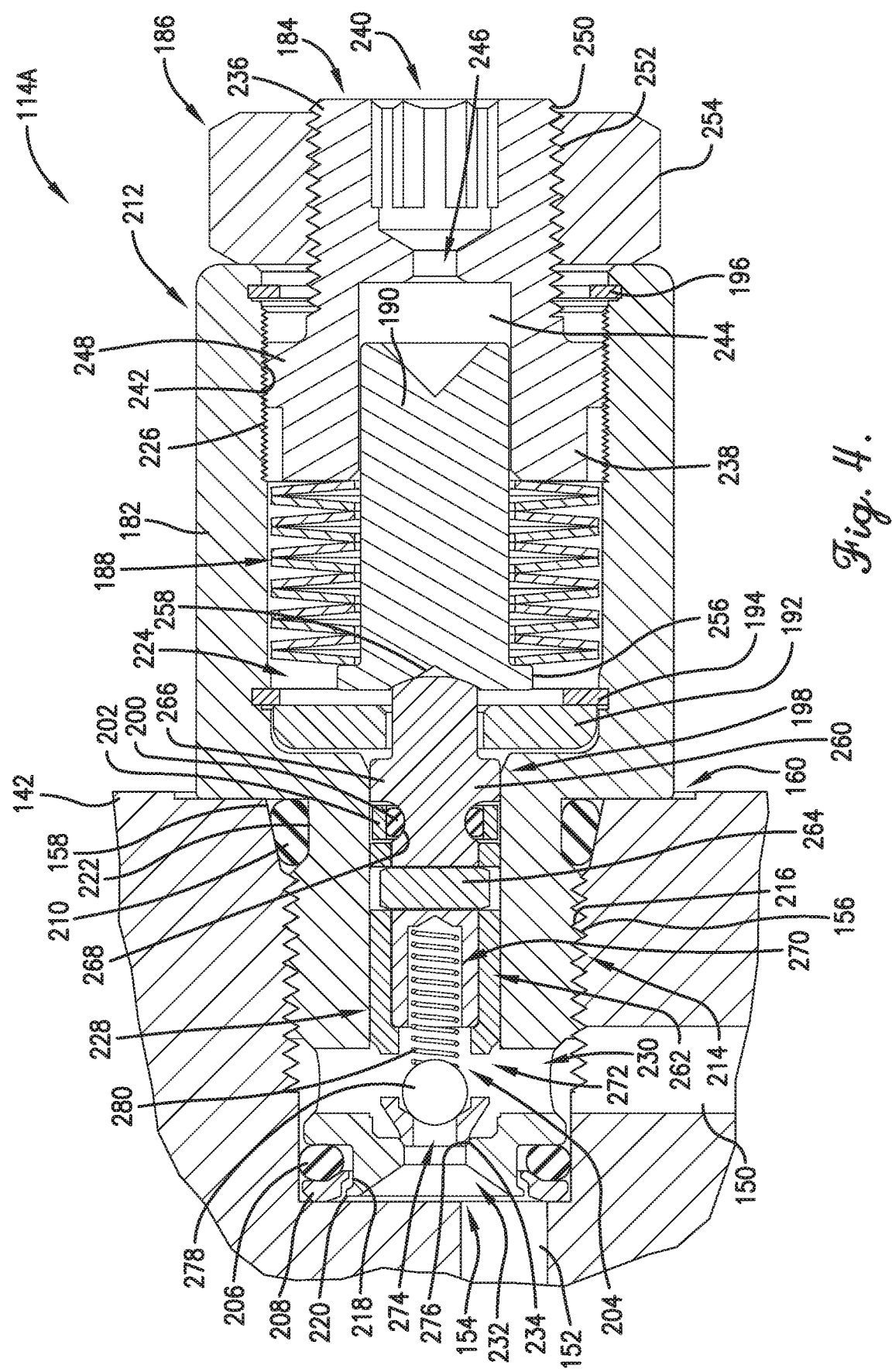
FIG. 4 is a partial cutaway elevation view of an in-port sequencing valve of the clamping system of FIG. 1.
Figure 5:
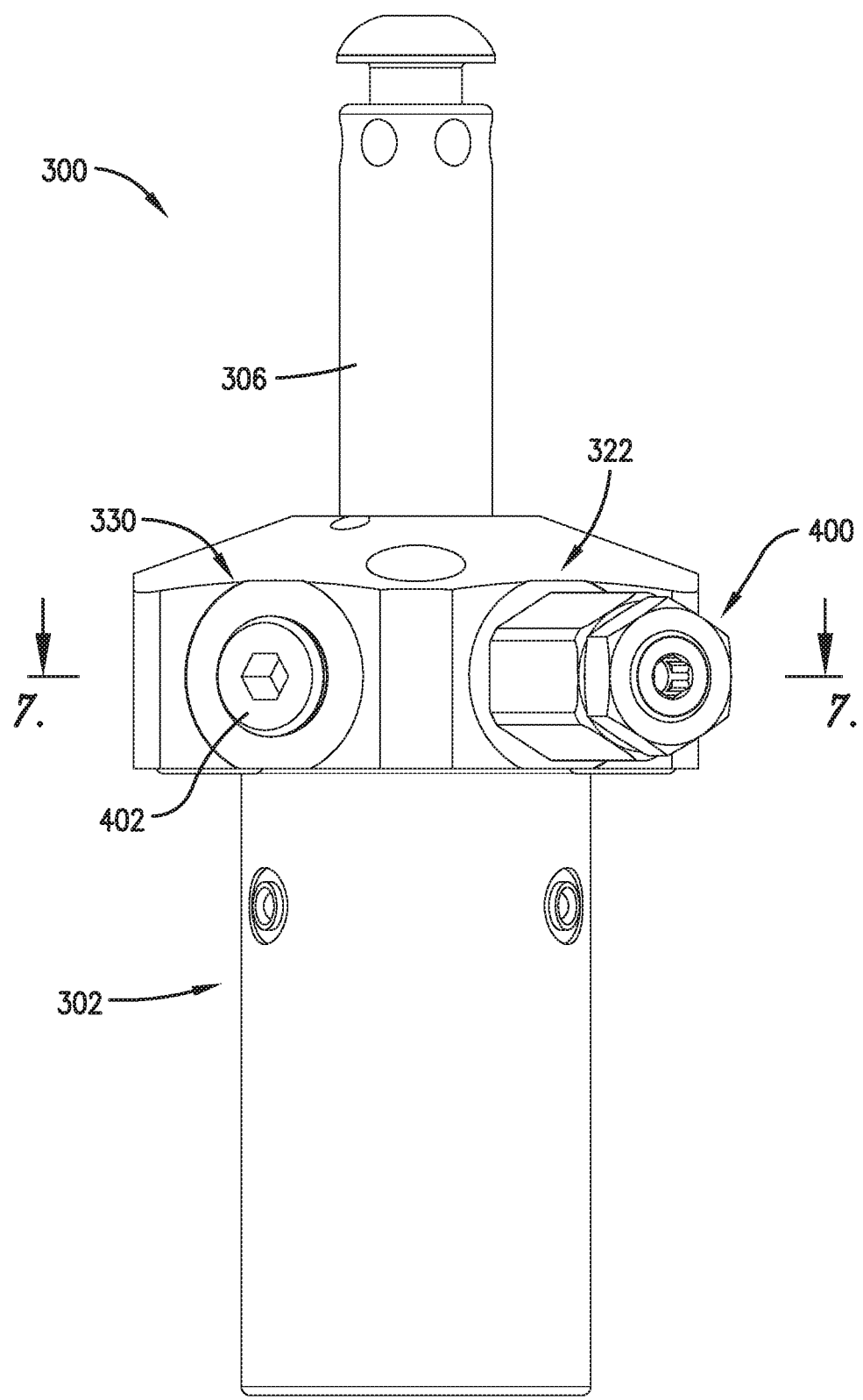
FIG. 5 is an elevation view of a clamping device constructed in accordance with another embodiment of the invention.
Figure 6:
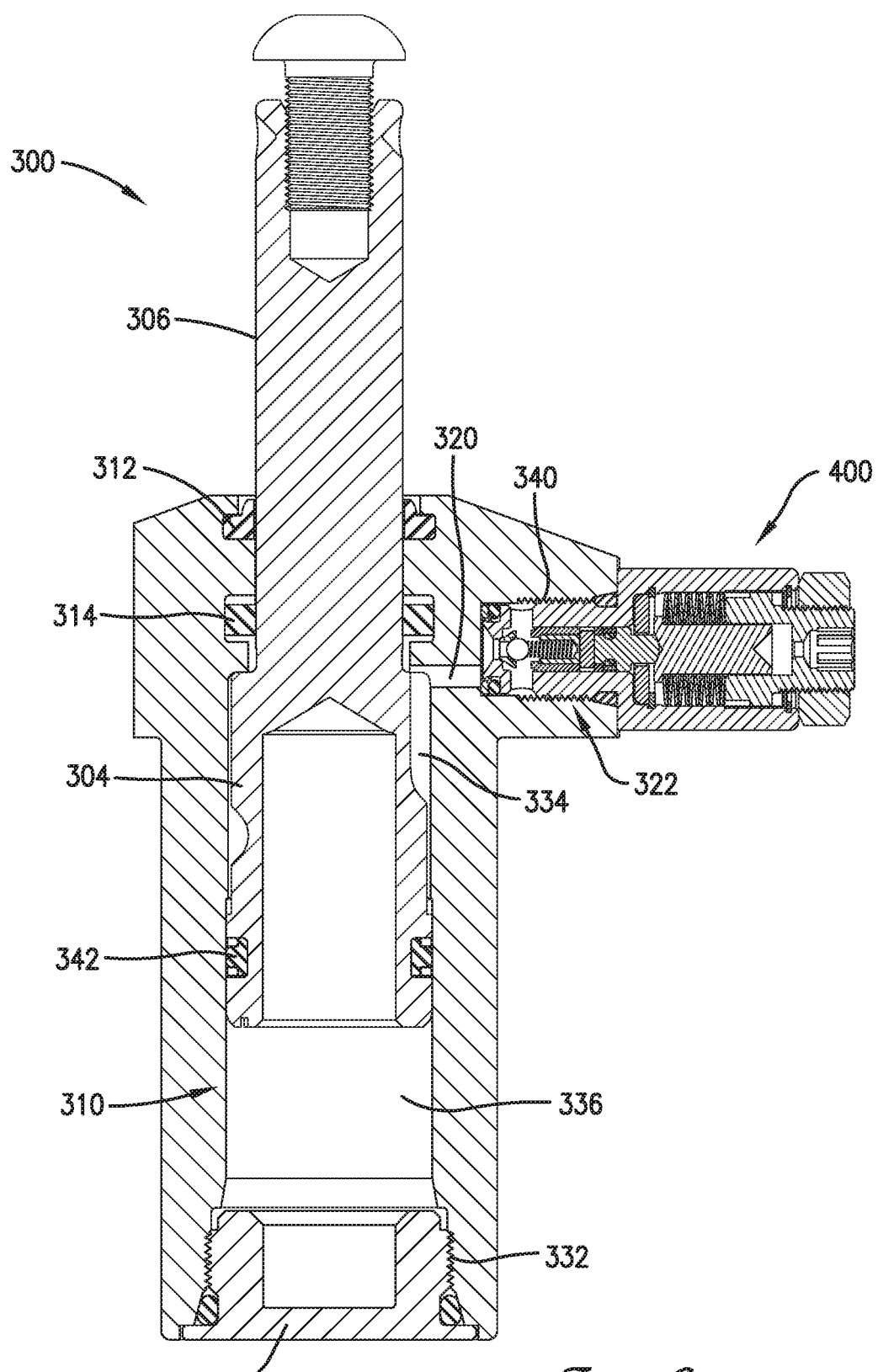
FIG. 6 is a cutaway elevation view of the clamping device of FIG. 5.
Figure 7:
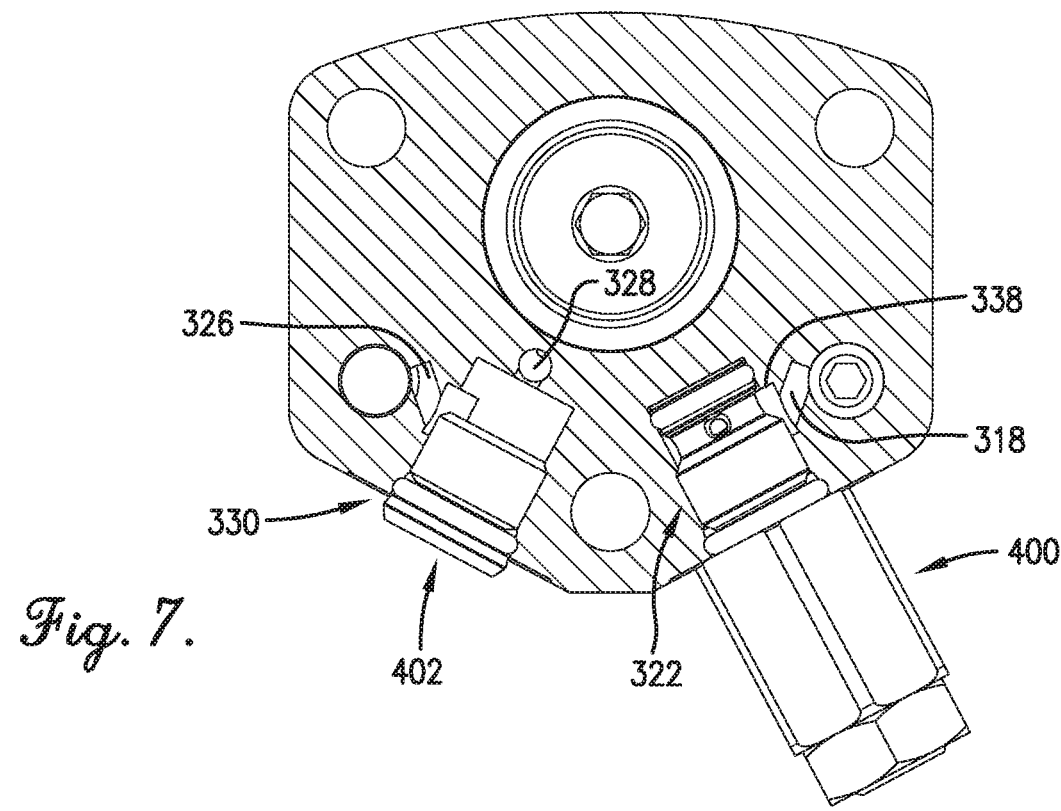
FIG. 7 is a cutaway plan view of the clamping device of FIG. 5.
Figure 8:
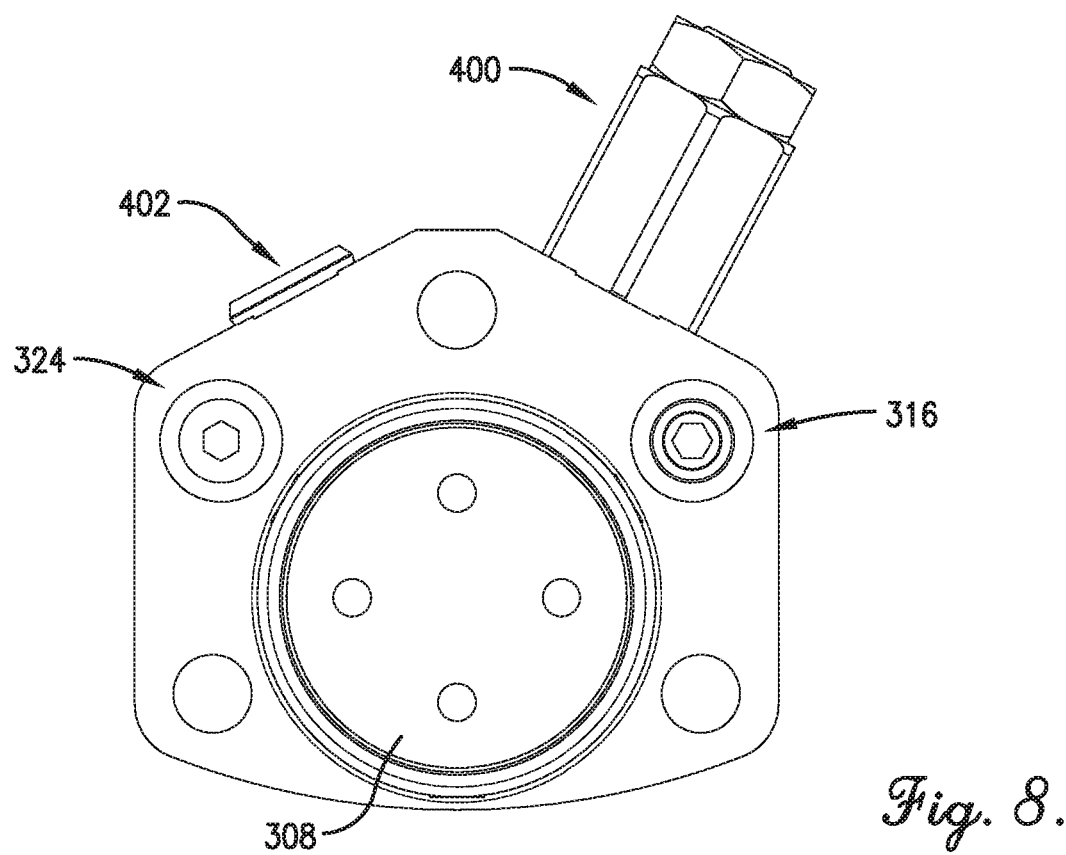
FIG. 8 is a bottom plan view of the clamping device of FIG. 5.

The lower block 142 supports the work support body 144 and includes an inlet passageway 150, and outlet passageway 152, and a clamp port 154 (as best seen in FIG. 4). The inlet passageway 150 fluidly connects the hydraulic clamp lines 120 to the clamp port 154 and radially (i.e., vertically in this case) intercepts the clamp port 154. The outlet passageway 152 fluidly connects the clamp port 154 to a piston bore and a locking sleeve chamber of the work support body 144 and extends longitudinally (i.e., horizontally in this case) from the clamp port 154.

The clamp port 154 is an open-ended cavity fluidly connected between the hydraulic clamp lines 120 via the inlet passageway 150 and the piston bore and the locking sleeve chamber via the outlet passageway 152. The clamp port 154 receives an in-port sequencing valve or a port plug depending on clamp sequencing as described below. In this exemplary embodiment, the clamp port 154 has received an in-port sequencing valve 114A described in more detail below. To that end, the clamp port 154 may include helical threads 156 (for securing the in-port sequencing valve 114A or a port plug therein), spot face seal geometry 158, and a spot face 160.

The work support body 144 may be positioned in the lower block 142 and may include a plunger chamber and the aforementioned piston bore and locking sleeve chamber. The work support body 144 may also include a hydraulic fluid passageway for connecting the outlet passageway 152 to the piston bore and locking sleeve chamber.

The plunger chamber at least partially encloses the plunger 146 and may be a substantially vertically extending cylindrical chamber. The plunger chamber may be fluidly partitioned or sealed from the piston bore and locking sleeve chamber such that the plunger chamber does not receive hydraulic fluid.

The piston bore at least partially encloses the work support piston therein and may be a substantially vertically extending cylindrical chamber. The piston bore receives hydraulic fluid below the work support piston for actuating the plunger via the work support piston.

The locking sleeve chamber at least partially encloses the locking sleeve and at least partially encircles the plunger chamber. The locking sleeve chamber receives hydraulic fluid for actuating the locking sleeve against the plunger 146.

The work support piston at least partially resides in the piston bore of the work support body 144 and is configured to shift the plunger 146 to an extended position when sufficient hydraulic pressure builds in the piston bore below the work support piston. The work support piston may be cylindrical or any other suitable shape.

The plunger 146 is at least partially positioned in the plunger chamber and vertically moves the workpiece contact 148 between a retracted position and an extended position. The plunger 146 may be cylindrical or any other suitable shape.

The workpiece contact 148 engages the workpiece 10 from below and may be a gripper, a shoe, a contact button, a contact bolt, an end effector, or the like. Alternatively, the plunger 146 may contact the workpiece 10 directly.

The locking sleeve at least partially encircles the plunger 146 and is configured to engage the plunger 146 when the plunger 146 is in an extended position. The locking sleeve may be flexible and/or may be shiftable between disengaged and engaged configurations or positions. The locking sleeve may be biased toward a disengaged position via a biasing spring or may be self-biased.

The link clamps 110A,B engage the workpiece 10 from above, opposite the work supports 108A,B, at the secondary support points and are substantially identical so only link clamp 110A will be described in detail. The link clamp 110A broadly comprises a riser base 164, a clamp body 166, a clamp piston, a piston rod 168, left and right fulcrum links 170A,B, and a pivot arm 172.

The riser base 164 supports the clamp body 166 and may include a cavity for receiving the clamp body 166 and hydraulic fluid passageways for fluidly connecting the link clamp 110A to the hydraulic clamp lines 120 and the hydraulic unclamp lines 122.

The clamp body 166 may be at least partially positioned in the riser base cavity and includes a clamp piston chamber, a clamp port 174, and an unclamp port 176. The clamp body 166 may also include hydraulic fluid passageways for fluidly connecting the clamp port 174 to the hydraulic clamp lines 120, the unclamp port 176 to the hydraulic unclamp lines 122, and the clamp port 174 and unclamp port 176 to the clamp piston chamber.

The clamp piston chamber encloses the clamp piston and may be a substantially vertically extending cylindrical chamber. The clamp piston chamber may be divided by a seal of the clamp piston into a clamp stroke region fluidly connected to the clamp port 174 and an unclamp stroke region fluidly connected to the unclamp port 176.

The clamp port 174 is an open-ended cavity fluidly connected between the hydraulic clamp lines 120 and the clamp stroke region of the clamp piston chamber. The clamp port 174 receives an in-port sequencing valve or a port plug depending on clamp sequencing as described below. In this exemplary embodiment, the clamp port 174 has received in-port sequencing valve 114C. To that end, the clamp port 174 may include in-port sequencing valve engaging features such as the ones described above.

The unclamp port 176 is an open-ended cavity fluidly connected between the hydraulic unclamp lines 122 and the unclamp stroke region of the clamp piston chamber. The unclamp port 176 receives an in-port sequencing valve or a port plug depending on the unclamp sequencing as described below. In this exemplary embodiment, the open end of the unclamp port 176 is closed via a port plug 112 while allowing hydraulic fluid to flow freely to the unclamp stroke region of the clamp piston chamber. To that end, the unclamp port 176 may include helical threads for securing the port plug 112 (or an in-port sequencing valve) therein.

The clamp piston vertically rotates the pivot arm 172 between an unclamped position and a clamped position via the piston rod 168. As mentioned above, the clamp piston seal may divide the piston chamber into the aforementioned clamp stroke region and unclamp stroke region.

The piston rod 168 extends upward from the clamp piston so as to connect the pivot arm 172 to the clamp piston. The piston rod 168 may be cylindrical and may be connected to the pivot arm 172 via a pin, a bolt, interlocking geometry, or the like.

The fulcrum links 170A,B create a pivot point for the pivot arm 172 and are themselves pivotably connected to the clamp body 166 and to the pivot arm 172 near a midpoint of the pivot arm 172. The fulcrum links 170A,B allow the pivot arm 172 to move in a complex motion so that the workpiece 10 can be removed from the clamping system 100 after unclamping.

The pivot arm 172 is configured to pivot over the workpiece 10 and is connected to the piston rod 168 near the pivot arm's proximal end and to the fulcrum links 170A,B near its midpoint. The pivot arm 172 is configured to move away from the workpiece 10 in a complex motion via the fulcrum links 170A,B so that the workpiece 10 can be removed from the clamping system 100 after unclamping.

The port plugs 112 are configured to be inserted into the clamp ports and/or unclamp ports of the swing clamps 106A-C, work supports 108A,B and link clamps 110A,B, depending on clamp or unclamp sequencing as described below, so as to seal off the open end while allowing hydraulic fluid to flow through the clamp ports or unclamp ports. To that end, the port plugs 112 may have a solid cylindrical body including external threads, and an annular seal.

The in-port sequencing valves 114A-D are substantially similar to each other and thus only in-port sequencing valve 114A will be described in detail with reference to FIG. 4. The in-port sequencing valve 114A dictates a clamping sequence of the work support 108A and broadly comprises a housing 182, a pre-load adjuster 184, a pre-load adjuster lock 186, a valve spring 188, a spring plunger 190, a stroke stop washer 192, a stroke stop retention ring 194, an adjustment retention ring 196, a valve piston 198, a valve piston seal 200, a valve piston seal ring 202, a check valve 204, a bottom port seal 206, a bottom port seal spacer 208, and a port spot-face seal 210.

The housing 182 houses the pre-load adjuster 184, the valve spring 188, the spring plunger 190, the stroke stop washer 192, and the valve piston 198 and includes opposing aft and forward portions 212, 214, outer clamp port threads 216, bottom port seal geometry 218, bottom port seal retention geometry 220, port spot-face seal geometry 222, a spring chamber 224, adjustment threads 226, a valve piston chamber 228, an inlet channel 230, and an outlet channel 232. The housing 182 may be formed of cast metal or machined metal stock.

The outer clamp port threads 216 encircle an outer side of the housing 182 near the forward portion 214 for securing the in-port sequencing valve 114A in the clamp port 154. Alternatively, other retaining features such as clips, latches, grooves, slots, cams, and the like may be used.

The bottom port seal geometry 218 receives the bottom port seal 206 and may be an annular groove near a distal end of the forward portion 214 of the housing 182. The bottom port seal retention geometry 220 retains the bottom port seal spacer 208 and hence the bottom port seal 206 on the forward portion 214 of the housing 182 and may be a small flange, a lip, a protrusion, or other similar feature. Importantly, the bottom port seal retention geometry 220 has an outer diameter greater than an inner diameter of the bottom port seal spacer 208.

The port spot-face seal geometry 222 receives the port spot-face seal 210 and may be an annular groove aft of the bottom port seal geometry 218. The port spot-face seal geometry 222 also prevents the port spot-face seal 210 from sliding forward or aft.

The spring chamber 224 is positioned in the aft portion 212 and connects to the valve piston chamber 228 near a midpoint of the housing 182. The spring chamber 224 at least partially receives the pre-load adjuster 184, the valve spring 188, the spring plunger 190, the stroke stop washer 192, the stroke stop retention ring 194, and the adjustment retention ring 196 therein. To that end, the spring chamber 224 may have a larger diameter than a diameter of the valve piston chamber 228.

The adjustment threads 226 encircle the spring chamber 224 aft of the valve spring 188 and engage adjustment threads of the pre-load adjuster 184. The adjustment threads 226 may be standard helical threads or may alternatively be any suitable groove, slot, or cam for converting axial rotation of the pre-load adjuster 184 to longitudinal movement of the pre-load adjuster 184 relative to the housing 182. The adjustment threads 226 may be a fine pitch thread, such as a $\frac{1}{64}^{th}$ inch pitch to provide 0.01562 inches of axial travel per revolution. This increases adjustment resolution and makes adjusting to specific settings easier.

The valve piston chamber 228 is positioned in the forward portion 214 of the housing 182 and is connected to the spring chamber 224 near the midpoint of the housing 182. The valve piston chamber 228 receives the valve piston 198 therein and may have a diameter substantially smaller than the diameter of the spring chamber 224. In one embodiment, the valve piston chamber 228 has a bore diameter having a tight tolerance with the valve piston 198 to ensure accurate alignment of the valve piston 198.

The inlet channel 230 extends radially inward from a side of the housing 182 into the valve piston chamber 228 and is configured to be fluidly aligned with the inlet passageway 150 connected to the clamp port 154. In some embodiments, additional inlet channels may be spaced around the circumference of the housing 182 for ensuring compatibility with other clamp ports.

The outlet channel 232 extends longitudinally from a distal end of the valve piston chamber 228 through the distal end of the forward portion 214 of the housing 182 for fluidly connecting the valve piston chamber 228 to the outlet passageway 152 connected to the clamp port 154. The outlet channel 232 may include complementary sealing geometry 234 for sealingly engaging complementary geometry of the valve piston 198. The complementary sealing geometry 234 (and the outlet channel 232) may be integral with the housing 182 or alternatively may be part of a separate component for ease of manufacturing. Importantly, the complementary sealing geometry 234 of the outlet channel 232 and the complementary geometry of the valve piston 198 form a metal-to-metal seat.

The pre-load adjuster 184 is in forcible communication with the valve spring 188 for compressing the valve spring 188 an amount corresponding to a selected valve activation setting and includes opposing aft and forward ends 236, 238, adjustment geometry 240, adjustment threads 242, a spring plunger cavity 244, a relief vent 246, a retention flange 248, and lock threads 250.

The adjustment geometry 240 receives a wrench or similar tool for selecting and/or adjusting the valve activation setting. In this embodiment, the adjustment geometry 240 is a female hexagonal cavity for receiving a hex key. Alternatively, the adjustment geometry 240 may have a star pattern, a flathead pattern, a cross pattern, a male hexagon pattern, or any other suitable geometry for receiving a corresponding tool.

The adjustment threads 242 engage adjustment threads 226 of the housing 182. The adjustment threads 242 may be standard helical threads or may be any suitable groove, slot, or cam for converting axial rotation of the pre-load adjuster 184 to axial movement of the pre-load adjuster 184 relative to the housing 182. The adjustment threads 242 may be a fine pitch thread, such as a $\frac{1}{64}^{th}$ inch pitch to provide 0.01562 inches of axial travel per revolution. This increases adjustment resolution and makes adjusting to specific settings easier.

The spring plunger cavity 244 extends to the forward end 238 of the pre-load adjuster 184 and receives an aft end of the spring plunger 190 therein. The spring plunger cavity 244 may also keep the spring plunger 190 in axial alignment with the valve piston 198 and the valve spring 188.

The relief vent 246 extends between the spring plunger cavity 244 and the adjustment geometry 240. Specifically, the relief vent 246 equalizes pressure in the spring chamber 224 with atmospheric pressure as the components in the spring chamber 224 are shifted. This prevents hysteresis (e.g., sluggish or non-existent response).

The retention flange 248 is configured to engage the adjustment retention ring 196 to ensure that the pre-load adjuster 184 cannot be removed from the spring chamber 224. To that end, the retention flange 248 may be a lip or other annular protrusion having an effective outer diameter greater than an effective inner diameter of the adjustment retention ring 196.

The lock threads 250 engage lock threads of the pre-load adjuster lock 186. The lock threads 250 may be standard helical threads or may be any suitable groove, slot, or cam for urging the pre-load adjuster lock 186 against the housing 182, thereby frictionally locking the pre-load adjuster 184 relative to the housing 182.

The pre-load adjuster lock 186 secures the pre-load adjuster 184 at a desired setting and includes lock threads 252 and a lock hex 254. The lock threads 252 engage with the lock threads 250 of the pre-load adjuster 184 so that the pre-load adjuster lock 186 can be tightened against the housing 182. The lock hex 254 allows the pre-load adjuster lock 186 to be tightened via a wrench or the like.

The valve spring 188 is disposed in the spring chamber 224 and is in forcible communication between the pre-load adjuster 184 and the spring plunger 190. The valve spring 188 may be a coil spring, a die spring, a disc spring, a wave spring, and the like. The valve spring 188 may also be a series of springs (i.e., a spring pack) stacked in parallel, in series, or in a combination of parallel and series. In one embodiment, the valve spring 188 includes a plurality of disc springs axially stacked in series. Spring type, number, and arrangement may be selected according to the desired spring force range, deflection range, and spring profile. The valve spring 188 can produce a large range of spring forces to produce sequence pressures of 300 psi to 4,000 psi. In one embodiment, spring forces of the valve spring 188 produce sequence pressures of at least 1,000 psi.

The spring plunger 190 is in forcible communication between the valve spring 188 and the valve piston 198 and may include spring engagement geometry 256 and a valve piston recess 258. The spring engagement geometry 256 is positioned near a forward end of the spring plunger 190 and may be a flange, a lip, or any other suitable feature for axially engaging the valve spring 188. The valve piston recess 258 extends into the forward end of the spring plunger 190 and receives an aft end of the valve piston 198. The valve piston recess 258 may have a tight tolerance with the valve piston 198 to ensure that the valve piston 198 is in concentric alignment with the spring plunger 190.

The stroke stop washer 192 establishes a maximum aft travel limit of the valve piston 198. The stroke stop washer 192 may have a tight tolerance fit (i.e., a locational fit) to ensure concentric alignment of the stroke stop washer 192 with the valve piston 198.

The stroke stop retention ring 194 keeps the stroke stop washer 192 near a forward end of the spring chamber 224 and may fit into a small groove in the spring chamber 224. An inner diameter of the stroke stop retention ring 194 may be smaller than an outer diameter of the stroke stop washer 192 so as to positively prevent movement of the stroke stop washer 192.

The adjustment retention ring 196 retains the pre-load adjuster 184 and hence the valve spring 188 and spring plunger 190 in the spring chamber 224. The adjustment retention ring 196 may sit in a small groove in the spring chamber 224. An inner diameter of the adjustment retention ring 196 may be smaller than an outer diameter of the retention flange 248 so as to positively prevent the pre-load adjuster 184 from being removed from the spring chamber 224.

The valve piston 198 governs passage of hydraulic fluid from the inlet channel 230 to the outlet channel 232 and may include an aft section 260, a forward section 262, and a connecting pin 264. The valve piston 198 may be disposed substantially in the valve piston chamber 228 in forcible communication with the spring plunger 190.

The aft section 260 may include an annular shoulder 266, seal ring receiving geometry 268, and a check valve spring recession 270. The aft section 260 may be radiused on its proximal end to form a ball-and-socket interface with the spring plunger 190. This ensures any mis-alignment in the spring chamber 224 does not result in a side load being transferred away from the point of engagement of the valve piston 198, thus compromising the seal between the valve piston 198 and the housing 182. The ball-and-socket interface also eliminates off-axis forces produced by the valve spring 188 during compression. The annular shoulder 266 may be configured to abut the stroke stop washer 192 so that the stroke stop washer 192 establishes a maximum aft travel limit of the valve piston 198. The seal ring receiving geometry 268 retains the valve piston seal 200 and the valve piston seal ring 202 therein and may be an annular groove or similar geometry. The check valve spring recession 270 may be a bore or similar cavity extending into the forward end of the aft section 260 for receiving a spring of the check valve 204.

The forward section 262 includes a check valve outlet through-hole 272, a check valve inlet through-hole 274, and complementary sealing geometry 276. The check valve outlet through-hole 272 aligns with or is in fluid communication with the inlet channel 230 of the housing 182. In one embodiment, the check valve outlet through-hole 272 extends radially through a side of the forward section 262 so as to be fluidly aligned with the inlet channel 230. The check valve inlet through-hole 274 extends longitudinally through a distal end of the forward section 262 so as to be fluidly aligned with the outlet channel 232. In one embodiment, the check valve inlet through-hole 274 extends axially through a distal end of the forward section 262. The forward section 262 may have a tapered or narrowing shape toward its distal end, the purpose of which will be described below. The forward section 262 may be formed of heat treatable material that can be hardened to increase wear resistance and sealability based on hardness differential. The forward section 262 may have a minimum guide length to diameter ratio to provide adequate alignment inside the valve piston chamber 228.

The complementary sealing geometry 276 is configured to contact the complementary sealing geometry 234 of the outlet channel 232 so as to form a hydraulic seal therebetween. In one embodiment, the complementary sealing geometry 276 extends annularly around the distal end of the forward section 262.

The connecting pin 264 retains the aft section 260 and the forward section 262 together so they slide longitudinally in unison and may be positioned in aligning receiving geometry of the aft section 260 and forward section 262. The connecting pin 264 may alternatively be a clip, a ring, a bolt, a set screw, or any other suitable component. The two-piece construction of the valve piston 198 (i.e., aft section 260 and forward section 262) allows the check valve 204 to be internally assembled and serviced and simplifies installation of the valve piston seal 200 and the seal ring 202.

The valve piston seal 200 encircles the aft section 260 in the seal ring receiving geometry 268 and prevents hydraulic fluid from passing into the spring chamber 224. The valve piston seal ring 202 encircles the valve piston seal 200 and slides against the inside of the valve piston chamber 228.

The valve piston seal 200 and valve piston seal ring 202 must be low-friction such as an ultra-low friction o-ring energized cap seal.

The check valve 204 governs the passage of hydraulic fluid from the check valve inlet through-hole 274 to the check valve outlet through-hole 272 (and hence from the outlet channel 232 to the inlet channel 230) when the valve piston 198 is in a closed position and may include a ball 278 and a check valve spring 280. The ball 278 is configured to be seated against an inner surface of the forward section 262 extending around the check valve inlet through-hole 274. The check valve spring 280 is at least partially disposed in the check valve spring recession 270 and biases the ball 278 toward the closed position so as to seal the check valve inlet through-hole 274 when a pressure difference from the outlet channel 232 to the inlet channel 230 is below a threshold. The check valve 204 may operate in parallel with the valve piston 198 as described in more detail below.

The bottom port seal 206 encircles the housing 182 near the distal end of the forward portion 214 and is seated in the bottom port seal geometry 218. The bottom port seal 206 engages a sidewall of the clamp port 154, thereby sealing the clamp port 154 between the inlet passageway 150 and the outlet passageway 152.

The bottom port seal spacer 208 encircles the housing 182 forward of the bottom port seal 206 and interlocks with the bottom port seal retention geometry 220. The bottom port seal spacer 208 may be a washer, a ring, or the like. The bottom port seal spacer 208 contacts a back wall of the clamp port 154 and thereby presses the bottom port seal 206 into sealing engagement with the clamp port 154.

The port spot-face seal 210 encircles the housing 182 near a middle of the housing 182 and is seated in the port spot-face seal geometry 222. The port spot-face seal 210 engages the spot-face seal geometry 158 of the clamp port 154 so as to seal the clamp port 154 to atmosphere and may be an o-ring, a gasket, or any other suitable seal.

Installation of the in-port sequencing valve 114A will now be described in more detail. The in-port sequencing valve 114A may be inserted into the clamp port 154 of the work support 108A such that the port spot-face seal 210 engages the spot-face seal geometry 158 of the clamp port 154. Specifically, the in-port sequencing valve 114A is axially turned so that outer clamp port threads 216 engage the helical threads 156 of the clamp port 154. Importantly, the bottom port seal 206 is configured to clear an inner diameter of the helical threads 156 of the work support 108A. Meanwhile, the bottom port seal spacer 208 contacts the back wall of the clamp port 154 and urges the bottom port seal 206 into engagement with the sidewall of the clamp port 154.

Presetting the in-port sequencing valve 114A will now be described in more detail. First, the pre-load adjuster 184 may be axially turned via a hex key inserted into the adjustment geometry 240. The pre-load adjuster 184 compresses the valve spring 188 as it turns due to interaction between the adjustment threads 242 of the pre-load adjuster 184 and the adjustment threads 226 of the housing 182. The pre-load adjuster 184 may be turned until the valve spring 188 is compressed an amount corresponding to a valve activation setting such as 1,000 psi or 2,500 psi.

The in-port sequencing valve 114A may then be locked at the selected valve activation setting via the pre-load adjuster lock 186. Specifically, the pre-load adjuster lock 186 may be axially turned via a hex wrench. The pre-load adjuster lock 186 in turn contacts the aft portion 212 of the housing 182 due to interaction between the lock threads 252 of the pre-load adjuster lock 186 and the lock threads 250 of the pre-load adjuster 184. Friction between the pre-load adjuster lock 186 and the housing 182 thereby prevents the pre-load adjuster 184 from rotating out of the selected valve activation setting.

Clamping the workpiece 10 via the clamping system 100 will now be described in more detail. First, the workpiece 10 may be positioned on the fixture datums 104A-C with the swing clamps 106A-C and link clamps 110A,B in an unclamp position and the work supports 108A,B in a retracted position. The system valve 118 may then be set to a clamp configuration so that the hydraulic pump 116 is fluidly connected to the hydraulic clamp lines 120.

The hydraulic pump 116 builds hydraulic pressure in the hydraulic clamp lines 120 whereby the swing clamps 106A-C are actuated at a first or "nominal" sequence pressure. Specifically, hydraulic fluid flows through the clamp ports 136 to the piston chambers of the swing clamps 106A-C so as to shift the swing arms 132 to a clamped position. Meanwhile, the nominal sequence pressure does not activate the in-port sequencing valves 114A-D installed in the work supports 108A,B and link clamps 110A,B. Also, hydraulic fluid in the unclamp hydraulic lines 122 and any unclamp ports may be allowed to flow to the reservoir 124.

The hydraulic pump 116 continues to build hydraulic pressure such that it eventually reaches a second sequence pressure corresponding to a valve activation setting of the in-port sequencing valves 114A,B installed in the work supports 108A,B. For example, the in-port sequencing valve 114A may be set to a valve activation setting of 1,000 psi. As the hydraulic pressure reaches the second sequence pressure of 1,000 psi, hydraulic fluid in the valve piston chamber 228 forces the valve piston 198 to an open position. Specifically, when the force from hydraulic pressure overcomes the bias force of the valve spring 188, the valve piston 198 begins to shift toward the spring chamber 224, thus allowing hydraulic fluid to flow into the outlet channel 232 and through the outlet passageway 152 to the piston bore and the locking sleeve chamber of the work support 108A.

This may cause a local drop in pressure on the valve piston 198 such that the valve spring 188 shifts the valve piston 198 back to a closed position. Hydraulic pressure builds against the valve piston 198 again and is released very rapidly via valve piston modulation due to the tapered or narrowing shape of the forward section 262 of the valve piston 198. A high modulation frequency provides apparent constant flow through the in-port valve 114A into the outlet passageway 152, thus smoothly pressurizing and actuating the work support 108A without disrupting hydraulic pressure elsewhere.

Hydraulic pressure building up in the piston bore of the work support 108A during valve piston modulation causes the work support piston to shift the plunger 146 to an extended position such that the workpiece contact 148 encounters the workpiece 10. Hydraulic pressure in the locking sleeve chamber also urges the locking sleeve of the work support 108A into engagement with the plunger 146 so as to lock the plunger 146 in the extended position. The work support 108B may be actuated simultaneously and in a similar manner as the work support 108A via the in-port sequencing valve 114B.

The hydraulic pump 116 continues to build hydraulic pressure such that it eventually reaches a third sequence pressure corresponding to a valve activation setting of the in-port sequencing valves 114C,D installed in the link clamps 110A,B. For example, the in-port sequencing valve 114C may be set to a valve activation setting of 2,500 psi.

As the hydraulic pressure reaches the third sequence pressure of 2,500 psi, the in-port sequencing valve 114C activates and allows hydraulic fluid to actuate the pivot arm 172 of the link clamp 110A against the workpiece 10. The link clamp 110B may be actuated similarly and simultaneously as the link clamp 110A via the in-port sequencing valve 114D. The valve activation setting of 2,500 psi ensures that the work supports 108A,B have sufficient pressure to provide support as the link clamps 110A,B contact and apply a clamping force to the workpiece 10.

The hydraulic pump 116 may continue to build hydraulic pressure to a system operating pressure such as 3,500 psi. At this point, the workpiece 10 is firmly clamped and ready for machining or milling.

The workpiece 10 may then be unclamped from the clamping system 100 as follows. First, the system valve 118 may be set to an unclamp configuration so that the hydraulic pump 116 is fluidly connected to the hydraulic unclamp lines 122 and so that the hydraulic clamp lines 120 are fluidly connected to the reservoir 124. Hydraulic fluid downstream of the in-port sequencing valve 114A may flow back upstream through the in-port sequencing valve 114A to the reservoir 124 because the valve piston 198 is in an open position due to the high hydraulic pressure. As the hydraulic pressure decreases, the valve piston 198 may close and hydraulic fluid downstream of the in-port sequencing valve 114A may continue to flow back upstream through the in-port sequencing valve 114A via the check valve 204.

Meanwhile, the hydraulic pump 116 may increase hydraulic pressure in the hydraulic unclamp lines 122 so as to actuate the swing clamps 106A-C and link clamps 110A,B to the unclamp position. In this example, the swing clamps 106A-C and link clamps 110A,B may all be actuated at a nominal sequence pressure because there are no in-port sequencing valves installed in their unclamp ports. However, in-port sequencing valves may be used for unclamp sequencing in the same way as the clamp sequencing described above.

The clamping system 100 provides several advantages. For example, sequencing pressure can be adjusted so that clamping devices actuate in a specific incremental order with some of the clamping devices actuating simultaneously. For example, in the above embodiment, the swing clamps 106A-C are set to actuate first, followed secondly by the work supports 108A,B, and followed thirdly by the link clamps 110A,B. Proper clamp contact order and repeatable workpiece loading allows for consistent, repeatable, and efficient machining and manufacturing. The in-port sequencing valves 114A-D can be used in both clamping and unclamping, even for a single clamping device.

The in-port sequencing valves 114A-D are "device level", thus allowing sequencing of individual clamping devices by installing the in-port sequencing valves 114A-D into clamping ports of selected clamping devices. This significantly simplifies hydraulic planning and circuit design. The in-port sequencing valves 114A-D can also be adjusted individually, which eliminates any need to redesign the entire hydraulic circuit. The in-port sequencing valves 114A-D also allow clamping circuits to be reduced to a clamp portion and an unclamp portion, thus eliminating system level sequencing valves and circuit branches downstream of system level sequencing valves. Furthermore, passageways within the circuit can be connected in series or in any arrangement that directs hydraulic fluid to the clamping devices. The in-port sequencing valves 114A-D eliminate the need for dedicated cavities or porting for system level sequence valves and can be adjusted independently of each other. Changing or tuning the clamping order can also be achieved during or even after fixture setup.

The in-port sequencing valve 114A can fit various industry standard hydraulic ports such as SAE #4, BSPP 1/8 and BSPP 1/4 ports. The in-port sequencing valve 114A may have one of several lengths for use in various clamp (and unclamp) port depths. Meanwhile, clamp ports can be located as part of the clamping device as described above or housed in a special fitting or block connected to a port of the clamping device. The small size of the in-port sequencing valve 114A provides compact installation in a clamp port.

The in-port sequencing valve 114A has an improved sealing system. Specifically, the bottom port seal spacer 208 and the bottom port seal retention geometry 220 retain the bottom port seal 206 in the bottom port seal geometry 218 such that the in-port sequencing valve 114A is self-contained. The bottom port seal 206 rests in the bottom port seal geometry 218 when the in-port sequencing valve 114A is not installed so that the bottom port seal 206 can clear a minor diameter of the clamp port helical threads 156 and does not get clipped by any undercuts of the inlet passageway 150 during installation. Once the bottom port seal spacer 208 contacts the back wall of the clamp port 154 as the in-port sequencing valve 114A is inserted into the clamp port 154, the bottom port seal spacer 208 compresses the bottom port seal 206 radially outward so that it contacts the sidewall of the clamp port 154. This simplifies installation of the in-port sequencing valve 114A.

The valve piston 198 provides several advantages. For example, the complementary sealing geometry 276 of the valve piston 198 seals against the complementary sealing geometry 234 of the housing 182 to provide a normally closed condition in a default state. The valve piston 198 has two-piece construction for internal check valve assembly and easier servicing. The forward section 262 of the valve piston 198 may be formed of a hardened heat treatable material so as to have high wear resistance and improved sealability based on hardness differential. The aft section 260 includes the annular shoulder 266 for stopping against the stroke stop washer 192. The aft section 260 also has a radiused end that fits into the valve piston recess 258 so as to form a ball and socket connection, thus ensuring that any misalignment doesn't transfer a side load to the forward section 262 of the valve piston 198. The ball and socket connection also eliminates off-axis forces produced by the valve spring 188 during compression. The tapered or narrowing shape of the forward section 262 encourages valve piston modulation, which allows for smooth activation of the in-port sequencing valve 114A and actuation of the work support 108A without disrupting hydraulic pressure elsewhere.

The valve spring 188 can comprise several springs or various types of springs. In particular, disc springs can make up various spring packs that produce a large range of spring forces to produce sequence pressures of 300 psi to 4,000 psi. In one embodiment, spring forces of the valve spring 188 produce sequence pressures of at least 1,000 psi. The disc springs can be stacked in parallel, in series, or a combination of parallel and series depending on the required force and deflection.

The stroke stop washer 192 limits travel of the valve piston 198, which provides a balance of flow area and spring compression. This ensures consistent and repeatable activation at a specific valve activation setting.

The relief vent 246 ensures that the spring chamber 224 is near atmospheric pressure and allows the spring chamber 224 to "breathe" as its internal volume changes due to valve piston movement. This prevents slow valve piston response (i.e., hysteresis).

The pre-load adjuster 184 allows the in-port sequencing valve 114A to be adjusted to a desired valve activation setting, while the pre-load adjuster lock 186 ensures that the pre-load adjuster 184 does not slip due to machine vibrations or inadvertent adjustments. The adjustment retention ring 196 limits aft travel of the pre-load adjuster 184 and retains components in the spring chamber 224.

With reference to FIGS. 5-8, a swing clamp 300 constructed in accordance with another embodiment will now be described in detail. The swing clamp 300 broadly comprises a riser base, a clamp body 302, a clamp piston 304, a piston rod 306, a swing arm, and a workpiece contact. In this embodiment, the swing clamp 300 is fitted with an in-port sequencing valve 400 (similar to the in-port sequencing valves 114A-D described above) and a port plug 402 (similar to the port plugs 112 described above).

The riser base supports the clamp body 302 and may include a cavity for receiving the clamp body 302 and hydraulic fluid passageways for fluidly connecting the swing clamp 300 to hydraulic clamp lines and hydraulic unclamp lines.

The clamp body 302 may be at least partially positioned in the riser base cavity and includes a piston chamber plug 308, a clamp piston chamber 310, a piston rod wiper 312, a piston rod seal 314, a clamp manifold port 316, a clamp inlet passageway 318, a clamp outlet passageway 320, a clamp port 322, an unclamp manifold port 324, an unclamp inlet passageway 326, an unclamp outlet passageway 328, and an unclamp port 330.

The piston chamber plug 308 encloses the clamp piston chamber 310 at the bottom of the clamp body 302. To that end, the piston chamber plug 308 may include helical threads 332 for engaging helical threads at a lower end of the clamp piston chamber 310.

The clamp piston chamber 310 encloses the clamp piston 304 and may be a substantially vertically extending cylindrical chamber. The clamp piston chamber 310 may be divided by a stroke seal of the clamp piston 304 (as described below) into a clamp stroke region 334 fluidly connected to the clamp port 322 and an unclamp stroke region 336 fluidly connected to the unclamp port 330.

The piston rod wiper 312 encircles the piston rod 306 and prevents debris from entering the clamp piston chamber 310. The piston rod seal 314 encircles the piston rod 306 below the piston rod wiper 312 and retains hydraulic fluid in the clamp piston chamber 310.

The clamp manifold port 316 allows a hydraulic clamp line to be fluidly connected to the clamp inlet passageway 318. To that end, the clamp manifold port 316 may include an o-ring face seal or the like. In some embodiments, the clamp manifold port 316 may be configured to be fluidly aligned with a fluid passageway of a fixture plate.

The clamp inlet passageway 318 fluidly connects the clamp manifold port 316 to the clamp port 322 and may radially (i.e., vertically in this case) intercept the clamp port 322. The clamp outlet passageway 320 fluidly connects the clamp port 322 to the clamp stroke region 334 of the clamp piston chamber 310 and may longitudinally (i.e., horizontally in this case) intercept the clamp port 322.

The clamp port 322 is an open-ended cavity fluidly connected between the hydraulic clamp lines and the clamp stroke region 334 of the clamp piston chamber 310. The clamp port 322 may include an undercut 338 near the clamp inlet passageway 318. The bottom-port seal of in-port sequencing valve 400 is configured to clear this undercut 338 without being clipped during installation. The clamp port 322 receives the in-port sequencing valve 400 or a port plug depending on the desired clamp sequencing. To that end, the clamp port 322 may include helical threads 340 (shown in FIG. 6) for securing the in-port sequencing valve 400 (or a port plug) therein.

The unclamp manifold port 324 allows a hydraulic unclamp line to be fluidly connected to the unclamp inlet passageway 326. To that end, the unclamp manifold port 324 may include an o-ring face seal or the like. The unclamp manifold port 324 may also be configured to be fluidly aligned with a fluid passageway of a fixture plate.

The unclamp inlet passageway 326 fluidly connects the unclamp manifold port 324 to the unclamp port 330 and may radially (i.e., vertically in this case) intercept the unclamp port 330. The unclamp outlet passageway 328 fluidly connects the unclamp port 330 to the unclamp stroke region 336 of the clamp piston chamber 310 and may longitudinally (i.e., horizontally in this case) extend from the unclamp port 330.

The unclamp port 330 is an open-ended cavity fluidly connected between the hydraulic unclamp lines and the unclamp stroke region 336 of the clamp piston chamber 310. The unclamp port 330 receives an in-port sequencing valve or a port plug depending on unclamp sequencing as described below. In this exemplary embodiment, the open end of the unclamp port 330 is closed via a port plug 402 while allowing hydraulic fluid to flow freely to the unclamp stroke region 336 of the clamp piston chamber 310. To that end, the unclamp port 330 may include helical threads for securing the port plug 402 (or an in-port sequencing valve) therein.

The clamp piston 304 vertically moves the piston rod 306 and hence the swing arm and workpiece contact between an unclamped position and a clamped position. The clamp piston 304 includes a stroke seal 342 for dividing the clamp piston chamber 310 into the clamp stroke region 334 and the unclamp stroke region 336.

The piston rod 306 extends upward from the clamp piston chamber 310 and connects the swing arm to the clamp piston 304. The piston rod 306 may be cylindrical and may follow a cam or the like to rotate the swing arm over the workpiece 10.

The swing arm extends over the workpiece in the clamped position. To that end, the swing arm is configured to be rotated about a vertical axis from the unclamped position to the clamped position via the piston rod 306.

The workpiece contact engages the workpiece from above and may be a gripper, a shoe, a contact button, a contact bolt, an end effector, or the like. Alternatively, the swing arm may contact the workpiece directly.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An in-port sequencing valve for controlling passage of hydraulic fluid into a hydraulic device via a port having an inlet passageway and an outlet passageway, the in-port sequencing valve comprising:
   a housing having a forward portion and an aft portion opposite the forward portion, the housing at least partially enclosing an inner chamber, an inlet channel configured to be fluidly aligned with the inlet passageway, and an outlet channel configured to be fluidly aligned with the outlet passageway;

a pre-load adjuster configured to be set to a selected valve activation setting;

a valve spring disposed in the inner chamber and in forcible communication with the pre-load adjuster such that the pre-load adjuster compresses the valve spring an amount corresponding to the selected valve activation setting; and a valve piston substantially disposed in the inner chamber in forcible communication with the valve spring so that the valve spring exerts a threshold spring force on the valve piston corresponding to the spring compression amount, the valve piston being configured to be shifted from a closed position in which hydraulic fluid cannot pass to the outlet channel from the inlet channel to an open position in which hydraulic fluid can pass to the outlet channel from the inlet channel when a force resulting from a pressure of the hydraulic fluid in the inlet channel overcomes the threshold spring force, the outlet channel and the valve piston including complementary sealing geometry for preventing hydraulic fluid from passing into the outlet channel when the valve piston is in the closed position.

2. The in-port sequencing valve of claim 1, further comprising a check valve including a ball and a check valve spring in forcible communication with the ball, the ball being configured to move from a closed position to an open position in which hydraulic fluid can pass from the outlet channel to the inlet channel when a pressure difference acting on the ball overcomes a bias force of the check valve spring.

3. The in-port sequencing valve of claim 1, the valve spring being a disc spring including a plurality of discs axially aligned with each other.

4. The in-port sequencing valve of claim 1, the port having a sidewall and a back wall, the in-port sequencing valve having a distal end, the housing further comprising bottom port seal retention geometry near the distal end, the in-port sequencing valve further comprising a bottom port seal and a spacer near the bottom port seal retention geometry, the bottom port seal being configured to be radially expanded into sealed engagement with the sidewall of the port when the spacer is pressed against the back wall of the port, the bottom port seal retention geometry being configured to retain the spacer on the forward portion of the housing.

5. The in-port sequencing valve of claim 1, the valve piston having a tapered or narrowing shape so that the valve piston is configured to undergo valve piston modulation.

6. The in-port sequencing valve of claim 1, further comprising a spring plunger in forcible communication between the valve spring and the valve piston.

7. The in-port sequencing valve of claim 1, further comprising a stroke stop washer positioned in the inner chamber and configured to limit travel of the valve piston in a direction of the open position.

8. The in-port sequencing valve of claim 1, the inlet channel extending radially through the housing, the outlet channel being axially aligned with the valve piston.

9. The in-port sequencing valve of claim 1, further comprising a pre-load adjuster lock configured to retain the pre-load adjuster at the selected spring compression setting.

10. An in-port sequencing valve for controlling passage of hydraulic fluid into a hydraulic device via a port having an inlet passageway and an outlet passageway, the valve comprising:

a housing having a forward portion and an aft portion opposite the forward portion, the housing forming:
a spring chamber in the aft portion,
a valve piston chamber in the forward portion and extending to the spring chamber,
an inlet channel configured to be fluidly aligned with the inlet passageway, and
an outlet channel configured to be fluidly aligned with the outlet passageway;

a pre-load adjuster configured to be set to a selected spring compression setting;

a disc spring disposed in the spring chamber and in forcible communication with the pre-load adjuster, the disc spring being configured to be axially compressed an amount corresponding to the selected spring compression setting so as to exert a desired threshold spring force corresponding to a sequence pressure of at least 1,000 psi;

a spring plunger substantially disposed in the spring chamber in forcible communication with and concentric with the disc spring; and a valve piston substantially disposed in the valve piston chamber in forcible communication with the spring plunger, the valve piston being configured to be shifted from a closed position in which hydraulic fluid cannot pass to the outlet channel from the inlet channel to an open position in which hydraulic fluid can pass to the outlet channel from the inlet channel when a force resulting from a pressure of the hydraulic fluid in the inlet channel overcomes the threshold spring force, the outlet channel of the housing and the valve piston including complementary sealing geometry for preventing hydraulic fluid from passing into the outlet channel when the valve piston is in the closed position.

11. The in-port sequencing valve of claim 10, further comprising a check valve including a ball and a check valve spring in forcible communication with the ball, the ball being configured to move from a closed position to an open position in which hydraulic fluid can pass from the outlet channel to the inlet channel when a force resulting from a pressure difference acting on the ball overcomes a bias force of the check valve spring.

12. The in-port sequencing valve of claim 10, the disc valve spring including a plurality of discs axially aligned with each other.

13. The in-port sequencing valve of claim 10, the port having a sidewall and a back wall, the in-port sequencing valve having a distal end, the housing further comprising bottom port seal retention geometry near the distal end, the in-port sequencing valve further comprising a bottom port seal and a spacer near the bottom port seal retention geometry, the bottom port seal being configured to be radially expanded into sealed engagement with the sidewall of the port when the spacer is pressed against the back wall of the port, the bottom port seal retention geometry being configured to retain the spacer on the forward portion of the housing.

14. The in-port sequencing valve of claim 10, the valve piston having a tapered or narrowing shape so that the valve piston is configured to undergo valve piston modulation.

15. The in-port sequencing valve of claim 10, further comprising an adjustment retention ring in the spring chamber, the adjustment retention ring being configured to retain the pre-load adjuster, the disc spring, and the spring plunger in the spring chamber.

16. The in-port sequencing valve of claim 10, further comprising a stroke stop washer configured to limit travel of the valve piston in a direction of the open position.

17. The in-port sequencing valve of claim 10, the inlet channel extending radially through the housing, the outlet channel being axially aligned with the valve piston.

18. The in-port sequencing valve of claim 10, further comprising a spring adjustment lock configured to retain the pre-load adjuster at the selected spring compression setting.

19. An in-port sequencing valve for controlling passage of hydraulic fluid into a hydraulic device via a port having an inlet passageway, an outlet passageway, a sidewall, and a backwall, the in-port sequencing valve comprising:
  a distal end;
  a housing having bottom port seal retention geometry near the distal end and a forward portion and an aft portion opposite the forward portion, the housing at least partially enclosing an inner chamber, an inlet channel configured to be fluidly aligned with the inlet passageway, and an outlet channel configured to be fluidly aligned with the outlet passageway;
  a pre-load adjuster configured to be set to a selected valve activation setting;
  a valve spring disposed in the inner chamber and in forcible communication with the pre-load adjuster such that the pre-load adjuster compresses the valve spring an amount corresponding to the selected valve activation setting;
  a valve piston substantially disposed in the inner chamber in forcible communication with the valve spring so that the valve spring exerts a threshold spring force on the valve piston corresponding to the spring compression amount, the valve piston being configured to be shifted from a closed position in which hydraulic fluid cannot pass to the outlet channel from the inlet channel to an open position in which hydraulic fluid can pass to the outlet channel from the inlet channel when a force resulting from a pressure of the hydraulic fluid in the inlet channel overcomes the threshold spring force;
  a bottom port seal near the bottom port seal retention geometry; and
  a spacer near the bottom port seal,
  the bottom port seal being configured to be radially expanded into sealed engagement with the sidewall of the port when the spacer is pressed against the back wall of the port, the bottom port seal retention geometry being configured to retain the spacer on the forward portion of the housing.

20. An in-port sequencing valve for controlling passage of hydraulic fluid into a hydraulic device via a port having an inlet passageway, an outlet passageway, a sidewall, and a backwall, the valve comprising:
  a distal end;
  a housing having bottom port seal retention geometry near the distal end and a forward portion and an aft portion opposite the forward portion, the housing forming:
    a spring chamber in the aft section,
    a valve piston chamber in the forward portion and extending to the spring chamber,
    an inlet channel configured to be fluidly aligned with the inlet passageway, and
    an outlet channel configured to be fluidly aligned with the outlet passageway;
  a pre-load adjuster configured to be set to a selected spring compression setting;
  a disc spring disposed in the spring chamber and in forcible communication with the pre-load adjuster, the disc spring being configured to be axially compressed an amount corresponding to the selected spring compression setting so as to exert a desired threshold spring force corresponding to a sequence pressure of at least 1,000 psi;
  a spring plunger substantially disposed in the spring chamber in forcible communication with and concentric with the disc spring;
  a valve piston substantially disposed in the valve piston chamber in forcible communication with the spring plunger, the valve piston being configured to be shifted from a closed position in which hydraulic fluid cannot pass to the outlet channel from the inlet channel to an open position in which hydraulic fluid can pass to the outlet channel from the inlet channel when a force resulting from a pressure of the hydraulic fluid in the inlet channel overcomes the threshold spring force;
  a bottom port seal near the bottom port seal retention geometry; and
  a spacer near the bottom port seal,
  the bottom port seal being configured to be radially expanded into sealed engagement with the sidewall of the port when the spacer is pressed against the back wall of the port, the bottom port seal retention geometry being configured to retain the spacer on the forward portion of the housing.

21. An in-port sequencing valve for controlling passage of hydraulic fluid into a hydraulic device via a port having an inlet passageway and an outlet passageway, the valve comprising:
  a housing having a forward portion and an aft portion opposite the forward portion, the housing forming:
    a spring chamber in the aft section,
    a valve piston chamber in the forward portion and extending to the spring chamber,
    an inlet channel configured to be fluidly aligned with the inlet passageway, and
    an outlet channel configured to be fluidly aligned with the outlet passageway;
  a pre-load adjuster configured to be set to a selected spring compression setting;
  a disc spring disposed in the spring chamber and in forcible communication with the pre-load adjuster, the disc spring being configured to be axially compressed an amount corresponding to the selected spring compression setting so as to exert a desired threshold spring force corresponding to a sequence pressure of at least 1,000 psi;
  a spring plunger substantially disposed in the spring chamber in forcible communication with and concentric with the disc spring;
  a valve piston substantially disposed in the valve piston chamber in forcible communication with the spring plunger, the valve piston being configured to be shifted from a closed position in which hydraulic fluid cannot pass to the outlet channel from the inlet channel to an open position in which hydraulic fluid can pass to the outlet channel from the inlet channel when a force resulting from a pressure of the hydraulic fluid in the inlet channel overcomes the threshold spring force; and
  an adjustment retention ring in the spring chamber, the adjustment retention ring being configured to retain the pre-load adjuster, the disc spring, and the spring plunger in the spring chamber.

* * * * *